United States Patent
Moriishi et al.

(10) Patent No.: US 10,665,894 B2
(45) Date of Patent: May 26, 2020

(54) LITHIUM AIR BATTERY THAT INCLUDES NONAQUEOUS LITHIUM ION CONDUCTOR

(71) Applicant: Panasonic Intellectual Property Management Co., Ltd., Osaka (JP)

(72) Inventors: Masako Moriishi, Osaka (JP); Yu Otsuka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 148 days.

(21) Appl. No.: 16/055,156

(22) Filed: Aug. 6, 2018

(65) Prior Publication Data

US 2019/0067733 A1 Feb. 28, 2019

(30) Foreign Application Priority Data

Aug. 31, 2017 (JP) .................. 2017-167456

(51) Int. Cl.

| | |
|---|---|
| *H01M 10/0525* | (2010.01) |
| *H01M 10/04* | (2006.01) |
| *H01M 4/64* | (2006.01) |
| *H01M 10/0564* | (2010.01) |
| *H01M 10/0567* | (2010.01) |
| *H01M 2/02* | (2006.01) |
| *H01M 12/08* | (2006.01) |

(52) U.S. Cl.
CPC ....... *H01M 10/0525* (2013.01); *H01M 2/022* (2013.01); *H01M 4/64* (2013.01); *H01M 10/045* (2013.01); *H01M 10/0459* (2013.01); *H01M 10/0564* (2013.01); *H01M 10/0567* (2013.01); *H01M 12/08* (2013.01)

(58) Field of Classification Search
CPC combination set(s) only.
See application file for complete search history.

(56) References Cited

U.S. PATENT DOCUMENTS

| | | | |
|---|---|---|---|
| 2017/0149105 A1* | 5/2017 | Kim ............... | H01M 4/382 |
| 2017/0179525 A1* | 6/2017 | Haeupler ......... | C08F 12/30 |
| 2019/0097231 A1* | 3/2019 | Kanzaki .......... | H01M 4/608 |

FOREIGN PATENT DOCUMENTS

JP 2017-512871 5/2017

OTHER PUBLICATIONS

Haeupler et al. "Poly(exTTF): A Novel Redox-Active Polymer as Active Material for Li-Organic Batteries." Macromolecular Rapid Comunications. 2014, 35, 1367-1371. (Year: 2014).*
Yuhui Chen et al., "Charging a Li—O2 battery using a redox mediator", Nature Chemistry, vol. 5, May 12, 2013, pp. 489-494.

* cited by examiner

*Primary Examiner* — Christopher P Domone
(74) *Attorney, Agent, or Firm* — McDermott Will & Emery LLP

(57) ABSTRACT

A lithium air battery includes: a negative electrode configured to occlude and release lithium ions; a positive electrode configured to use oxygen in air as a positive electrode active material; and an electrolyte liquid that is configured to function as a nonaqueous lithium ion conductor, and that is disposed between the negative electrode and the positive electrode.

8 Claims, 4 Drawing Sheets

LITHIUM AIR BATTERY THAT INCLUDES NONAQUEOUS LITHIUM ION CONDUCTOR

BACKGROUND

1. Technical Field

The present disclosure relates to a lithium air battery that includes a nonaqueous lithium ion conductor.

2. Description of the Related Art

A lithium air battery is a battery in which as a positive electrode active material, oxygen in the air is used, and as a negative electrode active material, a metal or a compound capable of occluding and releasing lithium ions is used.

The lithium air battery has advantages in that the energy density is high, the reduction in size can be easily achieved, and the reduction in weight can also be easily achieved. Hence, the lithium air battery has drawn attention as a battery having an energy density higher than that of a lithium ion battery which is currently considered to have the highest energy density.

In the lithium air battery, lithium peroxide is precipitated on a positive electrode by a discharge reaction and is then decomposed by a charge reaction. Lithium peroxide has low electron conductivity, which hinder the progress of the charge reaction. Hence, an improvement of cycle characteristics of the lithium air battery is disturbed.

In "Charging a Li—$O_2$ battery using a redox mediator", Nat. Chemistry, 2013, 5, pp. 489 to 494, by P.G. Bruce et al., an air battery including an electrolyte liquid which contains tetrathiafulvalene (TTF) has been disclosed. TTF functions as a catalyst to produce oxygen, which efficiently decomposes lithium peroxide. The oxygen generation catalyst promotes the decomposition of lithium peroxide by mediation of electron transfer between a positive electrode and lithium peroxide, and as a result, a charge potential is decreased.

SUMMARY

One non-limiting and exemplary embodiment provides a lithium air battery having a low charge potential.

In one general aspect, the techniques disclosed here feature a lithium air battery comprising: a negative electrode configured to occlude and release lithium ions; a positive electrode configured to use oxygen in air as a positive electrode active material; and an electrolyte liquid that is configured to function as a nonaqueous lithium ion conductor, and that is disposed between the negative electrode and the positive electrode. The electrolyte liquid contains a compound represented by the following formula (1).

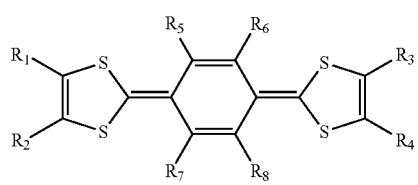

(1)

In the formula (1), $R_1$ to $R_4$ each independently represent a hydrogen atom, a halogen atom, a nitro group, a sulfate group, an alkoxycarbonyl group, or a hydrocarbon group having 1 to 12 carbon atoms. $R_5$ to $R_8$ each independently represent a hydrogen atom, a nitro group, a sulfate group, an alkoxycarbonyl group, or a hydrocarbon group having 1 to 22 carbon atoms. At least one selected from the group consisting of $R_5$ to $R_8$ is not a hydrogen atom. The hydrocarbon groups of $R_1$ to $R_8$ each may independently contain at least one selected from the group consisting of a halogen atom, a nitrogen atom, an oxygen atom, a sulfur atom, a silicon atom, and a phosphorus atom. $R_1$ and $R_2$ may be connected to each other to constitute a ring structure. $R_3$ and $R_4$ may be connected to each other to constitute a ring structure. $R_5$ and $R_6$ may be connected to each other to constitute a ring structure. $R_7$ and $R_8$ may be connected to each other to constitute a ring structure.

According to the technique of the aspect of the present disclosure, a lithium air battery having a low charge potential can be provided.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Figure 1:
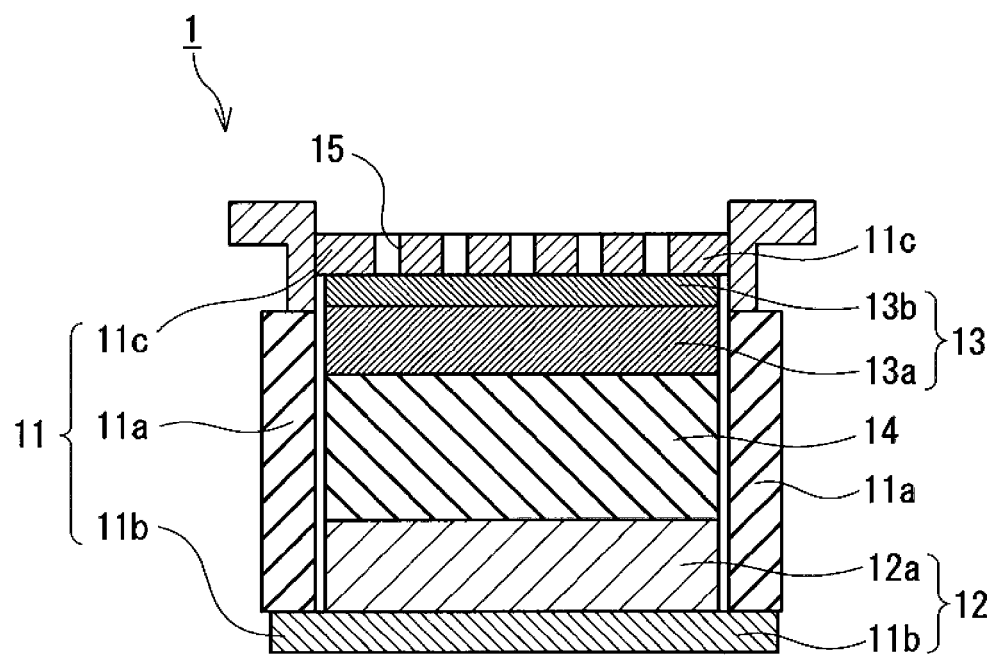
FIG. 1 is a schematic cross-sectional view of a lithium air battery according to one embodiment of the present disclosure.

DETAILED DESCRIPTION (Underlying Knowledge Forming Basis of the Present Disclosure)

In an oxidation-reduction reaction of TTF, electrons present in a π electron conjugated cloud are used. In the oxidation-reduction reaction as described above, compared to an oxidation-reduction reaction using bond cleavage and recombination, excellent repeating characteristics can be obtained. TTF has two five-membered heterocyclic rings each containing sulfur atoms. Since this five-membered heterocyclic ring has a π electron conjugated cloud, in a TTF in an oxidized state (TTF$^+$), the positive charge is delocalized. Hence, TTF performs a rapid and reversible electrochemical reaction. However, in order to efficiently decompose lithium peroxide, a catalyst to produce oxygen superior to that of TTF is required.

A lithium air battery according to a first aspect of the present disclosure comprises: a negative electrode configured to occlude and release lithium ions; a positive electrode configured to use oxygen in air as a positive electrode active material; and an electrolyte liquid that is configured to function as a nonaqueous lithium ion conductor, and that is disposed between the negative electrode and the positive electrode. The electrolyte liquid contains a compound represented by the following formula (1).

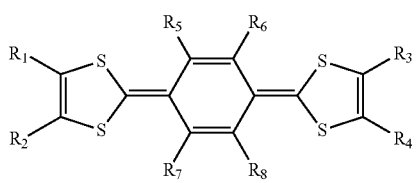

(1)

In the formula (1), $R_1$ to $R_4$ each independently represent a hydrogen atom, a halogen atom, a nitro group, a sulfate group, an alkoxycarbonyl group, or a hydrocarbon group having 1 to 12 carbon atoms. $R_5$ to $R_8$ each independently represent a hydrogen atom, a nitro group, a sulfate group, an alkoxycarbonyl group, or a hydrocarbon group having 1 to 22 carbon atoms. At least one selected from the group consisting of $R_5$ to $R_8$ is not a hydrogen atom. In other words, the case in which $R_5$ to $R_8$ each represent a hydrogen atom is excluded. The hydrocarbon groups of $R_1$ to $R_8$ each may independently contain at least one selected from the group consisting of a halogen atom, a nitrogen atom, an oxygen atom, a sulfur atom, a silicon atom, and a phosphorus atom. $R_1$ and $R_2$ may be connected to each other to constitute a ring structure. $R_3$ and $R_4$ may be connected to each other to constitute a ring structure. $R_5$ and $R_6$ may be connected to each other to constitute a ring structure. $R_7$ and $R_8$ may be connected to each other to constitute a ring structure.

According to the first aspect, the compound represented by the formula (1) is stable in a two-electron oxidized state as compared to that in a one-electron oxidized state. That is, the compound represented by the formula (1) is easily two-electron oxidized. Hence, the compound represented by the formula (1) functions as a charging catalyst which efficiently promotes the decomposition of lithium peroxide. Accordingly, the lithium air battery has a low charge potential.

In a second aspect of the present disclosure, for example, the compound of the lithium air battery according to the first aspect is represented by the following formula (2).

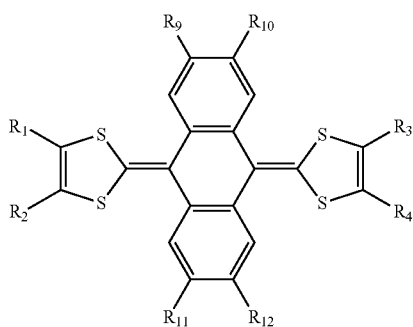

(2)

In the formula (2), $R_1$ to $R_4$ each independently represent a hydrogen atom, a halogen atom, a nitro group, a sulfate group, an alkoxycarbonyl group, or a hydrocarbon group having 1 to 12 carbon atoms. $R_9$ to $R_{12}$ each independently represent a hydrogen atom, a halogen atom, a nitro group, a sulfate group, an alkoxycarbonyl group, or a hydrocarbon group having 1 to 14 carbon atoms. The hydrocarbon groups of $R_1$ to $R_4$ and $R_9$ to $R_{12}$ each may independently contain at least one selected from the group consisting of a halogen atom, a nitrogen atom, an oxygen atom, a sulfur atom, a silicon atom, and a phosphorus atom. $R_1$ and $R_2$ may be connected to each other to constitute a ring structure. $R_3$ and $R_4$ may be connected to each other to constitute a ring structure. $R_9$ and $R_{10}$ may be connected to each other to constitute a ring structure. $R_{11}$ and $R_{12}$ may be connected to each other to constitute a ring structure.

According to the second aspect, the compound represented by the formula (2) has an extended π electron conjugated skeleton and a highly symmetric molecular structure. By the compound represented by the formula (2), a stable and reversible oxidation-reduction reaction occurs. The compound represented by the formula (2) functions as the charging catalyst which efficiently promotes the decomposition of lithium peroxide. Hence, the lithium air battery has a low charge potential.

In a third aspect of the present disclosure, for example, in the compound of the lithium air battery of the second aspect represented by the formula (2), $R_1$ to $R_4$ and $R_9$ to $R_{12}$ each represent a hydrogen atom. According to the third aspect, the molecular weight of the compound represented by the formula (2) is small. Hence, while functioning as an excellent oxygen generation catalyst, the compound represented by the formula (2) can realize a lithium air battery having a high weight energy density.

In a fourth aspect of the present disclosure, for example, the compound of the lithium air battery according to the first or the second aspect is represented by the following formula (3).

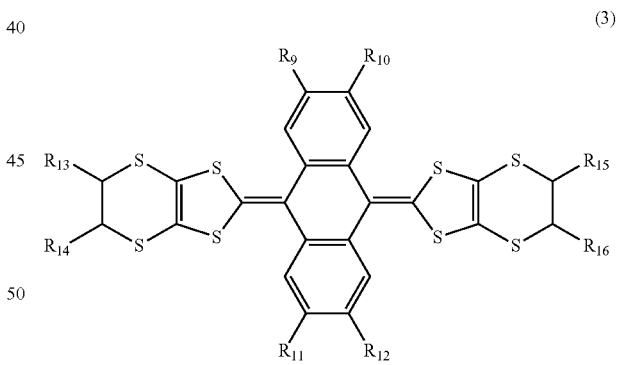

(3)

In the formula (3), $R_9$ to $R_{12}$ each independently represent a hydrogen atom, a halogen atom, a nitro group, a sulfate group, an alkoxycarbonyl group, or a hydrocarbon group having 1 to 14 carbon atoms. $R_{13}$ to $R_{16}$ each independently represent a hydrogen atom, a halogen atom, a nitro group, a sulfate group, an alkoxycarbonyl group, or a hydrocarbon group having 1 to 5 carbon atoms. The hydrocarbon groups of $R_9$ to $R_{16}$ each may independently contain at least one selected from the group consisting of a halogen atom, a nitrogen atom, an oxygen atom, a sulfur atom, a silicon atom, and a phosphorus atom. $R_9$ and $R_{10}$ may be connected to each other to constitute a ring structure. $R_{11}$ and $R_{12}$ may be connected to each other to constitute a ring structure. $R_{13}$ and $R_{14}$ may be connected to each other to constitute a ring structure. $R_{15}$ and $R_{16}$ may be connected to each other to constitute a ring structure.

According to the fourth aspect, the compound represented by the formula (3) has an extended π electron conjugated skeleton and a highly symmetric molecular structure. By the compound represented by the formula (3), a stable and reversible oxidation-reduction reaction occurs. The compound represented by the formula (3) functions as the charging catalyst which efficiently promotes the decomposition of lithium peroxide. Hence, the lithium air battery has a low charge potential.

In a fifth aspect of the present disclosure, for example, in the compound represented by the formula (3) of the lithium air battery of the fourth aspect, $R_9$ to $R_{16}$ each represent a hydrogen atom. According to the fifth aspect, the molecular weight of the compound represented by the formula (3) is small. Hence, while functioning as an excellent oxygen generation catalyst, the compound represented by the formula (3) can realize a lithium air battery having a high weight energy density.

In a sixth aspect of the present disclosure, for example, the concentration of the compound in the electrolyte liquid of the lithium air battery according to any one of the first to the fifth aspects is 0.01 mmol/L or more. According to the sixth aspect, the lithium air battery has a low charge potential.

In a seventh aspect of the present disclosure, for example, the electrolyte liquid of the lithium air battery according to any one of the first to the sixth aspects further contains tetraethylene glycol dimethyl ether. According to the seventh aspect, tetraethylene glycol dimethyl ether is not likely to evaporate and is stable against oxygen radicals. Hence, the electrolyte liquid is suitable for a lithium air battery.

Hereinafter, embodiments of the present disclosure will be described with reference to the drawings. The present disclosure is not limited to the following embodiments.

FIG. 1 is a schematic cross-sectional view of a lithium air battery according to one embodiment of the present disclosure. As shown in FIG. 1, a lithium air battery 1 of this embodiment includes a battery case 11, a negative electrode 12, a positive electrode 13, and an electrolyte layer 14 functioning as a nonaqueous lithium ion conductor. An electrolyte liquid may be used as the electrolyte layer 14. The battery case 11 includes a cylindrical portion 11a in which a top surface side and a bottom surface side are opened, a bottom portion 11b provided so as to close the bottom surface-side opening of the cylindrical portion 11a, and a lid portion 11c provided so as to close the top surface-side opening of the cylindrical portion 11a. In the lid portion 11c, air inlet holes 15 introducing air into the battery case 11 are provided. The negative electrode 12 includes a negative electrode layer 12a disposed on an upper surface of the bottom portion 11b of the battery case 11. The bottom portion 11b of the battery case 11 also functions as a negative electrode collector of the negative electrode 12. That is, the bottom portion 11b also functioning as the negative electrode collector and the negative electrode layer 12a collectively form the negative electrode 12. The positive electrode 13 is formed of a positive electrode layer 13a containing a carbon material and a positive electrode collector 13b disposed between the positive electrode layer 13a and the lid portion 11c of the battery case 11. The electrolyte layer 14 of the lithium air battery 1 may include a separator. Besides the bottom portion 11b, a negative electrode collector may also be provided.

A battery reaction in the lithium air battery 1 having the structure as described above is as follows.

Discharge reaction (while the battery is used)

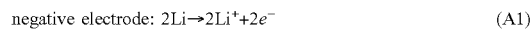

negative electrode: $2Li \rightarrow 2Li^+ + 2e^-$ (A1)

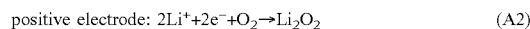

positive electrode: $2Li^+ + 2e^- + O_2 \rightarrow Li_2O_2$ (A2)

Charge reaction (while the battery is charged)

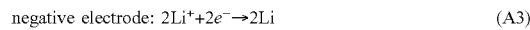

negative electrode: $2Li^+ + 2e^- \rightarrow 2Li$ (A3)

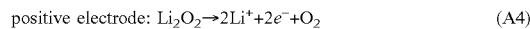

positive electrode: $Li_2O_2 \rightarrow 2Li^+ + 2e^- + O_2$ (A4)

During the discharge, as shown by the formulas (A1) and (A2), electrons and lithium ions are released from the negative electrode 12. When electrons are incorporated into the positive electrode 13, oxygen incorporated from the outside of the battery simultaneously reacts with lithium ions at the positive electrode 13, and lithium peroxide is generated. During the charge, as shown by the formulas (A3) and (A4), electrons and lithium ions are incorporated into the negative electrode 12. From the positive electrode 13, electrons, lithium ions, and oxygen are released. In this specification, a material promoting the reaction shown by the formula (A4) may be called a charging catalyst, a catalyst to produce oxygen, or a redox mediator in some cases.

Next, the individual members of the lithium air battery 1 as described above will be described in detail.

1. Positive Electrode

As described above, the positive electrode 13 includes the positive electrode layer 13a and may further include the positive electrode collector 13b. Hereinafter, the positive electrode layer 13a and the positive electrode collector 13b will be described respectively.

(Positive Electrode Layer)

The positive electrode layer 13a contains a material which enables oxygen in the air to be oxidized and reduced as a positive electrode active material. As the material described above, the positive electrode layer 13a of this embodiment contains an electrically conductive porous material containing carbon. A carbon material to be used as the electrically conductive porous material containing carbon may have a high electron conductivity. In particular, there may be used a carbon material, such as acetylene black or Ketjen black, which is generally used as an electrically conductive auxiliary agent. In view of the specific surface area and the size of primary particles, electrically conductive carbon black, such as Ketjen black, may be used. The carbon material is generally a powder. The specific surface area of the carbon material is, for example, 800 to 2,000 m²/g and may also be 1,200 to 1,600 m²/g. When the specific surface area of the carbon material is in the range as described above, the positive electrode layer 13a is easily formed to have a fine pore structure. The specific surface area is a value to be measured by a BET method.

In addition, according to "Charging a Li—O₂ battery using a redox mediator", Nat. Chemistry, 2013, 5, pp. 489 to 494, by P.G. Bruce et al., although the battery was evaluated using a gold electrode as the positive electrode, the case in which an electrically conductive porous material containing carbon is used as the electrode has not been disclosed.

The positive electrode layer 13a may further contain a binder fixing the above electrically conductive porous material. As the binder, a material known as the binder for the positive electrode layer 13a of the lithium air battery 1 may be used. As the binder, for example, a poly(vinylidene fluoride) (PVdF) or a polytetrafluoroethylene (PTFE) may be mentioned. The content of the binder in the positive electrode layer 13a is not particularly limited and is, for example, in a range of 1 to 40 percent by mass.

Since being changed in accordance with the application of the lithium air battery 1, the thickness of the positive electrode layer 13a is not particularly limited. The thickness of the positive electrode layer 13a is, for example, in a range of 2 to 500 μm and may also be in a range of 5 to 300 μm.

The positive electrode layer 13a may be formed, for example, by the following method. After a solvent is added to a composition containing a carbon material, mixing thereof is performed. If needed, additives, such as a binder, may also be contained in the composition. The mixture (to be used as a coating liquid) thus obtained is applied on the positive electrode collector 13b by a coating method, such as a doctor blade method, and at least one coating film thus obtained was dried. Accordingly, the positive electrode 13 is obtained. A sheet-shaped positive electrode layer 13a without provided with the positive electrode collector 13b may be formed in such a way that after the coating film of the mixture is dried, the dried coating film is rolled by a roll press method or the like. The sheet-shaped positive electrode layer 13a may also be directly formed by compression pressing of the composition described above.

(Positive Electrode Collector)

The positive electrode collector 13b is a member collecting electric charges of the positive electrode layer 13a. A material of the positive electrode collector 13b is not particularly limited as long as having an electrical conductivity. As the material of the positive electrode collector 13b, for example, stainless steel, nickel, aluminum, iron, titanium, or carbon may be mentioned. As the shape of the positive electrode collector 13b, for example, a foil shape, a plate shape, or a mesh (such as a grid) shape may be mentioned. Among those mentioned above, in this embodiment, the shape of the positive electrode collector 13b may be a mesh shape. The reason for this is that a mesh-shaped positive electrode collector 13b is excellent in electric charge collection efficiency. In this case, the mesh-shaped positive electrode collector 13b may be disposed in the positive electrode layer 13a. Furthermore, the lithium air battery of this embodiment may further include another positive electrode collector 13b (such as a foil-shaped collector) collecting electric charges collected by the mesh-shaped positive electrode collector 13b. In this embodiment, the battery case 11 which will be described later may also have a function of the positive electrode collector 13b. The thickness of the positive electrode collector 13b is, for example, in a range of 10 to 1,000 μm and may also be in a range of 20 to 400 μm.

2. Negative Electrode

As described above, the negative electrode includes the negative electrode collector and may further include the negative electrode layer 12a. Hereinafter, the negative electrode layer 12a and the negative electrode collector will be described respectively.

(Negative Electrode Layer)

The negative electrode layer 12a of this embodiment may contain a negative electrode active material capable of occluding and releasing lithium ions. As the negative electrode active material described above, a material is not particularly limited as long as containing lithium elements, and for example, there may be mentioned a simple metal (such as metal lithium), an alloy containing a lithium element, an oxide containing a lithium element, or a nitride containing a lithium element. As the alloy containing a lithium element, for example, there may be mentioned a lithium aluminum alloy, a lithium tin alloy, a lithium lead alloy, or a lithium silicon alloy. As the metal oxide containing a lithium element, for example, there may be mentioned a lithium titanium oxide. As the metal nitride containing a lithium element, for example, there may be mentioned a lithium cobalt nitride, a lithium iron nitride, or a lithium manganese nitride.

The negative electrode layer 12a may contain only the negative electrode active material or may also contain a binder besides the negative electrode active material. When the negative electrode active material has a foil shape, the negative electrode layer 12a may contain only the negative electrode active material, and when the negative electrode active material is a powder, the negative electrode layer 12a may contain both the negative electrode active material and the binder. As the binder, a material known as the binder for the negative electrode layer 12a of the lithium air battery 1 may be used, and for example, a PVdF or a PTFE may be mentioned. The content of the binder in the negative electrode layer 12a is not particularly limited and may be, for example, in a range of 1 to 40 percent by mass. As a method for forming the negative electrode layer 12a using a powdered negative electrode active material, as is the method for forming the positive electrode layer 13a described above, a formation method, such as a doctor blade method or a compression pressing method, may be used.

(Negative Electrode Collector)

The negative electrode collector is a member collecting electric charges of the negative electrode layer 12a. A material of the negative electrode collector is not particularly limited as long as having an electrical conductivity. A material known as the negative electrode collector of the lithium air battery 1 may be used. As the material of the negative electrode collector, for example, copper, stainless steel, nickel, or carbon may be mentioned. As the shape of the negative electrode collector, for example, there may be mentioned a foil shape, a plate shape, or a mesh (such as a grid) shape. The negative electrode collector may be formed from a porous material having an irregular surface. The battery case 11 which will be described later may also function as the negative electrode collector.

3. Separator

The lithium air battery 1 of this embodiment may include a separator disposed between the positive electrode 13 (or the positive electrode layer 13a) and the negative electrode 12 (or the negative electrode layer 12a). Since the separator is disposed between the positive electrode 13 and the negative electrode 12, a highly safe battery can be obtained. As long as having a function of electrically separating the positive electrode layer 13a from the negative electrode layer 12a, the separator is not particularly limited. As the separator, for example, a porous insulating material may be used, and a porous film, such as a polyethylene (PE) porous film or a polypropylene (PP) porous film; a resin non-woven cloth, such as a PE non-woven cloth or a PP non-woven cloth; a glass fiber non-woven cloth: a paper non-woven cloth, or the like may be mentioned.

The porosity of the separator is, for example, in a range of 30% to 90%. When the porosity is in the range as described above, a sufficient amount of the electrolyte can be held in the separator, and at the same time, the separator has a sufficient strength. The porosity of the separator may also be in a range of 35% to 60%. The porosity can be calculated from the true density, the total volume including pores, and the weight of the material.

4. Electrolyte Layer (Lithium Ion Conductor)

The electrolyte layer 14 is a layer which is disposed between the positive electrode 13 (or the positive electrode layer 13a) and the negative electrode 12 (or the negative electrode layer 12a) and which conducts lithium ions. The electrolyte layer 14 is a nonaqueous lithium ion conductor. The nonaqueous lithium ion conductor contains a compound represented by the following formula (1). The compound represented by the formula (1) has the structure in which a benzene ring is located between two oxidation-reduction portions.

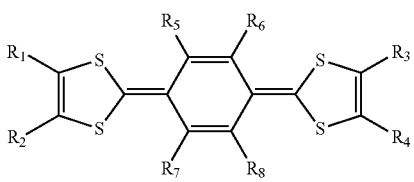
(1)

In the formula (1), $R_1$ to $R_4$ each independently represent a hydrogen atom, a halogen atom, a nitro group, a sulfate group, an alkoxycarbonyl group, or a hydrocarbon group having 1 to 12 carbon atoms. $R_5$ to $R_5$ each independently represent a hydrogen atom, a nitro group, a sulfate group, an alkoxycarbonyl group, or a hydrocarbon group having 1 to 22 carbon atoms. At least one selected from the group consisting of $R_5$ to $R_5$ is not a hydrogen atom. The carbon numbers of the hydrocarbon groups of $R_1$ to $R_5$ each may be independently 1 to 5.

The halogen atom includes, for example, at least one selected from the group consisting of a fluorine atom, a chlorine atom, a bromine atom, and an iodine atom.

The alkyl group included in the alkoxycarbonyl group may be either a linear or a branched alkyl group having 1 to 5 carbon atoms. The linear or the branched alkyl group having 1 to 5 carbon atoms includes, for example, at least one selected from the group consisting of a methyl group, an ethyl group, a n-propyl group, an iso-propyl group, a n-butyl group, an iso-butyl group, a tert-butyl group, and a n-pentyl group.

The hydrocarbon group may have either a chain structure or a cyclic structure. The chain structure may be either a linear or a branched structure. The hydrocarbon group may include, for example, at least one selected from the group consisting of a chain saturated aliphatic group, a cyclic saturated aliphatic group, a chain unsaturated aliphatic group, and an aromatic group.

The chain saturated aliphatic group includes, for example, an alkyl group. The chain saturated aliphatic group may be either a linear or a branched alkyl group having 1 to 5 carbon atoms. As the linear or the branched alkyl group having 1 to 5 carbon atoms, the aforementioned alkyl groups may also be mentioned. At least one hydrogen atom contained in the chain saturated aliphatic group may be substituted by an aryl group. The aryl group includes, for example, at least one selected from the group consisting of a phenyl group, a methylphenyl group, a nitrophenyl group, a methoxyphenyl group, a chlorophenyl group, a biphenyl group, an a-naphthyl group, a β-naphthyl group, and an anthryl group. The chain saturated aliphatic group substituted by an aryl group includes, for example, at least one selected from the group consisting of a benzyl group, a methylbenzyl group, a nitrobenzyl group, a methoxybenzyl group, a chlorobenzyl group, a phenylethyl group, 1-methyl-1-phenylethyl group, 1,1-dimethyl-2-phenylethyl group, 1,1-dimethyl-3-phenylpropyl group, an a-naphthylmethyl group, and a β-naphthylmethyl group.

The cyclic saturated aliphatic group includes, for example, a cycloalkyl group having 3 to 6 carbon atoms. The cycloalkyl group having 3 to 6 carbon atoms includes, for example, at least one selected from the group consisting of a cyclopropyl group, cyclobutyl group, a cyclopentyl group, and a cyclohexyl group.

The chain unsaturated aliphatic group includes, for example, at least one selected from the group consisting of an alkenyl group and an alkynyl group. The chain unsaturated aliphatic group may be either a linear or a branched alkenyl group having 2 to 4 carbon atoms or may be either a linear or a branched alkynyl group having 2 to 4 carbon atoms. The linear or the branched alkenyl group having 2 to 4 carbon atoms includes, for example, at least one selected from the group consisting of a vinyl group, a 1-propenyl group, a 2-propenyl group, a 1-methyl-1-propenyl group, a 2-methyl-1-propenyl group, a 2-methyl-2-propenyl group, a 2-butenyl group, a 1-butenyl group, and a 3-butenyl group. The linear or the branched alkynyl group having 2 to 4 carbon atoms includes, for example, at least one selected from the group consisting of an ethynyl group, a 2-propynyl group, a 2-butynyl group, a 3-butynyl group, and a 1-methyl-2-propynyl group.

The aromatic group includes, for example, an aryl group. As the aryl group, the aforementioned groups may also be mentioned.

The hydrocarbon groups of $R_1$ to $R_8$ each may independently include at least one selected from the group consisting of a halogen atom, a nitrogen atom, an oxygen atom, a sulfur atom, a silicon atom, and a phosphorus atom. In this specification, the "hydrocarbon group includes - - - atom" indicates that by the mentioned atom or the group containing the mentioned atom, at least one hydrogen atom contained in the hydrocarbon group or at least one carbon atom contained in the hydrocarbon group is substituted. That is, in this specification, the hydrocarbon group may contain at least one selected from the group consisting of an alkoxy group, a hydroxyalkyl group, and a thioalkyl group. Even in the case in which the hydrocarbon group contains an atom other than a carbon atom and a hydrogen atom, the carbon number of the hydrocarbon group indicates the number of carbon atoms contained in the hydrocarbon group.

The substituent including a nitrogen atom includes, for example, at least one selected from the group consisting of an amino group, an imino group, a cyano group, and a nitro group. The substituent including an oxygen atom includes, for example, at least one selected from the group consisting of an alkoxy group, a hydroxy group, an alkyl group having a hydroxy group, and an oxo group. The substituent including a sulfur atom includes, for example, at least one selected from the group consisting of a sulfo group, a sulfonyl group, a thiocarbonyl group, and a sulfamoyl group. The substituent including a silicon atom includes, for example, a silyl group.

$R_1$ and $R_2$ may form a ring structure by bonding therebetween. $R_3$ and $R_4$ may form a ring structure by bonding therebetween. $R_5$ and $R_6$ may form a ring structure by bonding therebetween. $R_7$ and $R_8$ may form a ring structure by bonding therebetween.

The ring structure includes, for example, at least one selected from the group consisting of an aromatic ring and a heterocyclic ring. The aromatic ring includes, for example, at least one selected from the group consisting of a benzene ring, a condensed ring containing at least one benzene ring, and a connected ring containing at least one benzene ring. The condensed ring containing at least one benzene ring includes, for example, at least one selected from the group consisting of a naphthalene ring, an anthracene ring, a pyrene ring, a chrysene ring, and a naphthacene ring. The connected ring containing at least one benzene ring includes, for example, at least one selected from the group consisting of a biphenylene ring and a bianthracene ring. The bianthracene ring indicates, as is the case of the biphenylene ring, a ring in which the carbon atoms having the same positional number of two anthracene rings are bonded to each other. The compound represented by the formula (1) may have the structure in which two dithiol rings are bonded to one of the aromatic rings mentioned above. In this case, the aromatic ring may have a highly symmetric property and a high crystallinity. As the aromatic ring described above, for example, there may be mentioned a benzene ring, a naphthalene ring, an anthracene ring, a naphthacene ring, a biphenylene ring, or a bianthracene ring.

The heterocyclic ring indicates a ring containing a hetero atom. The hetero atom includes, for example, at least one selected from the group consisting of a nitrogen atom, an oxygen atom, a sulfur atom, a silicon atom, and a phosphorus atom. The heterocyclic ring includes, for example, at least one selected from the group consisting of a nitrogen-containing aromatic ring, an oxygen-containing aromatic ring, and a sulfur-containing aromatic ring. The heterocyclic ring contains one to two hetero atoms. The heterocyclic ring may be a single ring. The heterocyclic ring may be formed from two to three rings. The heterocyclic ring is, for example, a five-membered ring, a six-membered ring, or a seven-membered ring.

The nitrogen-containing aromatic ring includes, for example, at least one selected from the group consisting of a pyrrole ring, a pyrazole ring, a imidazole ring, a triazole ring, a pyridine ring, a pyridazine ring, a triazine ring, an azepine ring, a diazepine ring, a triazepine ring, an indole ring, a quinoline ring, and a naphthazine ring. The basic skeleton of the five-membered nitrogen-containing aromatic ring is a pyrrole ring. The basic skeleton of the six-membered nitrogen-containing aromatic ring is a pyridine ring. The basic skeleton of the seven-membered nitrogen-containing aromatic ring is an azepine ring. The oxygen-containing aromatic includes, for example, at least one selected from the group consisting of a furan ring, a pyran ring, a benzofuran ring, and a benzopyran ring. The basis skeleton of the five-membered oxygen-containing aromatic ring is a furan ring. The sulfur-containing aromatic includes, for example, at least one selected from the group consisting of a thiol ring, a dithiin ring, a thiotropilidene ring, and a benzothiophene ring. The basic skeleton of the five-membered sulfur-containing aromatic ring is a thiol ring. The basic skeleton of the six-membered sulfur-containing aromatic ring is a dithiin ring. The basic skeleton of the seven-membered sulfur-containing aromatic ring is a thiotropilidene ring.

The heterocyclic ring may include at least one selected from the group consisting of a thiazole ring, a thiazine ring, an oxazole ring, an oxadiazole ring, a silole ring, and a phosphole ring. The thiazole ring and the thiazine ring each contain a nitrogen atom and a sulfur atom. The oxazole ring and the oxadiazole ring each contain a nitrogen atom and an oxygen atom. The silole ring contains a silicon atom. The phosphole ring contains a phosphorus atom.

At least one hydrogen atom contained in the ring structure may be independently substituted by a halogen atom, a nitro group, a sulfate group, an alkoxycarbonyl group, or a hydrocarbon group having 1 to 5 carbon atoms. As the halogen atom, the alkoxycarbonyl group, and the hydrocarbon group, for example, the aforementioned atoms and groups may also be mentioned.

As a particular example of the compound represented by the formula (1), the following compounds (4) to (7) may be mentioned.

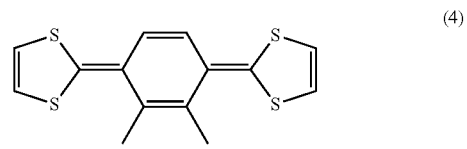

(4)

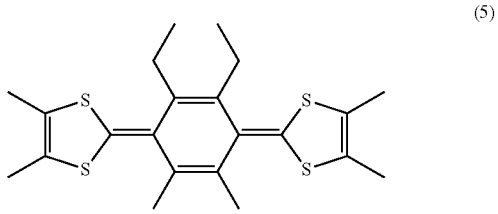

(5)

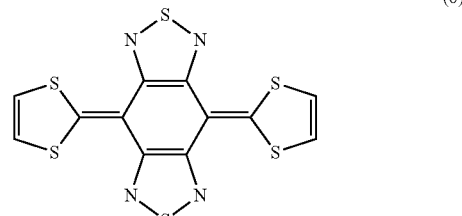

(6)

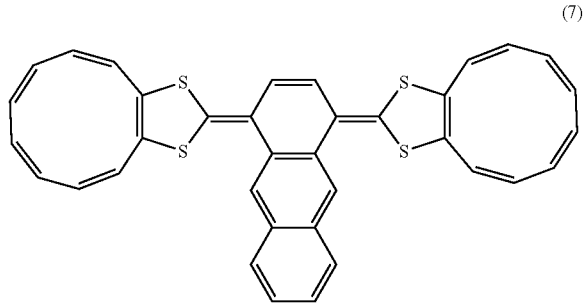

(7)

The compound represented by the formula (1) may be a compound represented by the following formula (2). The compound represented by the formula (2) has the structure in which an anthracene ring is located between two oxidation-reduction portions.

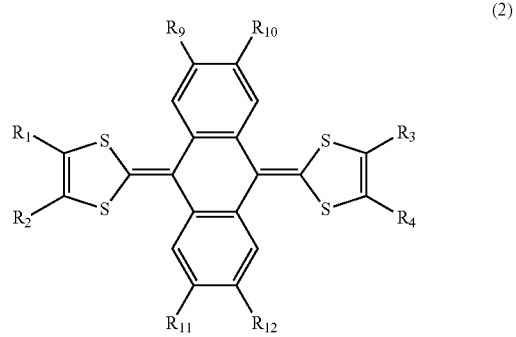

(2)

In the formula (2), $R_1$ to $R_4$ are the same as $R_1$ to $R_4$ of the formula (1). $R_9$ to $R_{12}$ each independently represent a hydrogen atom, a halogen atom, a nitro group, a sulfate group, an alkoxycarbonyl group, or a hydrocarbon group having 1 to 14 carbon atoms. The carbon number of the hydrocarbon group of each of $R_9$ to $R_{12}$ may be 1 to 5. As the halogen atom, the alkoxycarbonyl group, and the hydrocarbon group, for example, the aforementioned atoms and groups may also be mentioned.

The hydrocarbon groups of $R_9$ to $R_{12}$ each may independently include at least one selected from the group consisting of a halogen atom, a nitrogen atom, an oxygen atom, a sulfur atom, a silicon atom, and a phosphorus atom. $R_9$ and $R_{10}$ may form a ring structure by bonding therebetween. $R_{11}$ and $R_{12}$ may form a ring structure by bonding therebetween. As the ring structure, for example, the aforementioned structures may also be mentioned.

As a particular example of the compound represented by the formula (2), the following compounds (8) to (11) may be mentioned.

(8)
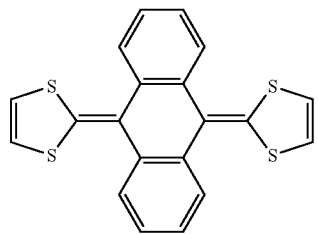

(9)
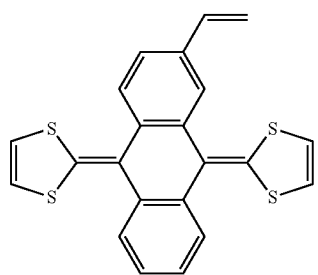

(10)
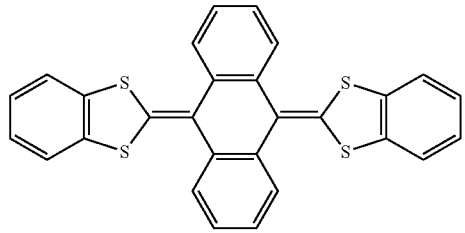

(11)
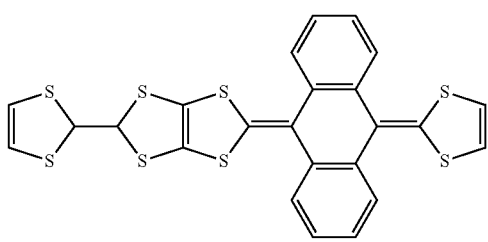

The compound represented by the formula (1) or (2) may also be the compound represented by the following formula (3). The compound represented by the formula (3) has the structure in which an anthracene ring is located between two oxidation-reduction portions.

(3)
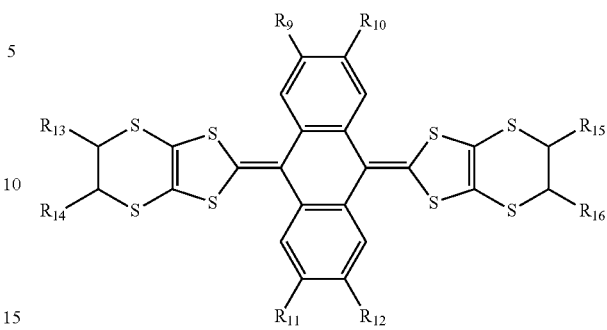

In the formula (3), $R_9$ to $R_{12}$ are the same as $R_9$ to $R_{12}$ of the formula (2). $R_{13}$ to $R_{16}$ each independently represent a hydrogen atom, a halogen atom, a nitro group, a sulfate group, an alkoxycarbonyl group, or a hydrocarbon group having 1 to 5 carbon atoms. As the halogen atom, the alkoxycarbonyl group, and the hydrocarbon group, for example, the aforementioned atoms and groups may also be mentioned.

The hydrocarbon groups of $R_{13}$ to $R_{16}$ each may independently include at least one selected from the group consisting of a halogen atom, a nitrogen atom, an oxygen atom, a sulfur atom, a silicon atom, and a phosphorus atom. $R_{13}$ and $R_{14}$ may form a ring structure by bonding therebetween. $R_{15}$ and $R_{16}$ may form a ring structure by bonding therebetween. As the ring structure, the aforementioned structures may also be mentioned.

As a particular example of the compound represented by the formula (3), the following compounds (12) to (14) may be mentioned.

(12)
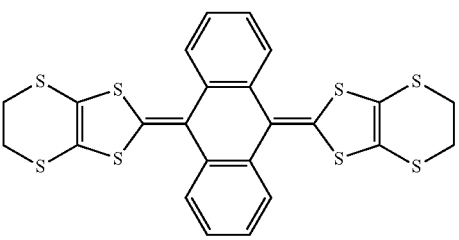

(13)
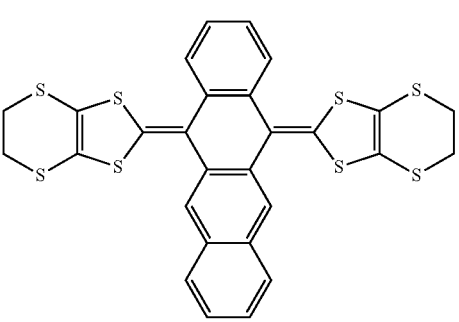

-continued

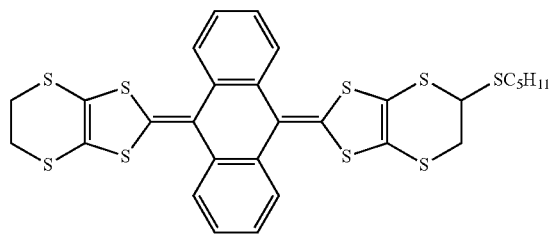

(14)

The nonaqueous lithium ion conductor includes, for example, at least one selected from the group consisting of the compound represented by the formula (1), the compound represented by the formula (2), and the compound represented by the formula (3). In this specification, the compound represented by any one of the formulas (1) to (3) may also be called the "π electron conjugated compound" in some cases.

In the present disclosure, the π electron conjugated compound has the structure in which an aromatic ring is located between two oxidation-reduction portions. That is, the π electron conjugated compound has an extended π electron conjugated skeleton. The π electron conjugated compound has a nonplanar structure caused by steric hindrance between a substituent or a hydrogen atom of the aromatic ring and a sulfur atom of the dithiol ring. This nonplanar structure is also called a butterfly structure. Since the π electron conjugated compound has a nonplanar structure, a monocationic compound generated by only one-electron oxidation of the π electron conjugated compound is unstable in terms of the structure. When the π electron conjugated compound is two-electron oxidized, the two dithiol rings have aromatic properties, and hence, the steric hindrance is reduced. At this stage, since generated positive charges are delocalized in the aromatic rings, the π electron conjugated compound is stabilized. As described above, the π electron conjugated compound in a two-electron oxidized state is stabler than that in a one-electron oxidized state. Hence, the π electron conjugated compound is easily two-electron oxidized. In other words, the π electron conjugated compound is two-electron oxidized by one step.

A related redox mediator is one-electron oxidized by one step or is two-electron oxidized by two steps. A potential at which the π electron conjugated compound of the present disclosure is two-electron oxidized is represented by $V_1$. A potential at which the related redox mediator is two-electron oxidized is represented by $V_2$. $V_1$ is a value smaller than $V_2$. That is, the π electron conjugated compound is two-electron oxidized at a low potential. Hence, when the π electron conjugated compound is used as a redox mediator, the mass of the redox mediator required for the nonaqueous lithium ion conductor can be significantly reduced as compared to that in the past. As described above, compared to the related redox mediator, the π electron conjugated compound efficiently promotes the decomposition of lithium peroxide. Hence, the lithium air battery 1 of the present disclosure has a low charge potential. Since the charge potential of the lithium air battery 1 is low, application of a high voltage to each member of the lithium air battery 1 can be avoided. Accordingly, the member of the lithium air battery 1 can be suppressed from being degraded by oxidation. As a result, the lithium air battery 1 has excellent cycle characteristics.

In particular, when the lithium air battery 1 of the present disclosure is charged, the π electron conjugated compound is changed into a dicationic compound by oxidation on the surface of the positive electrode 13. This dicationic compound functions as the charging catalyst which promotes the decomposition of lithium peroxide. In particular, the compound represented by the formula (2) and the compound represented by the formula (3) each have an extended π electron conjugated skeleton and a highly symmetric molecular structure. By the compound represented by the formula (2) or the compound represented by the formula (3), a stable and reversible oxidation-reduction reaction occurs. Among the compounds represented by the formula (2), the compound (8) has a small molecular weight. Hence, while functioning as an excellent oxygen generation catalyst, the compound (8) can realize a lithium air battery 1 having a high weight energy density. As is the case described above, among the compounds represented by the formula (3), the compound (12) has a small molecular weight. Hence, while functioning as an excellent oxygen generation catalyst, the compound (12) can realize a lithium air battery 1 having a high weight energy density.

The concentration of the π electron conjugated compound in the nonaqueous lithium ion conductor is, for example, 0.01 mmol/L or more. The upper limit of the concentration of the π electron conjugated compound in the nonaqueous lithium ion conductor is, for example, 200 mmol/L.

As long as the electrolyte layer 14 has a lithium ion conductivity (i.e., as long as the electrolyte layer 14 functions as a lithium ion conductor), the form thereof is not particularly limited and may be either a solution system represented by an organic solvent system containing a lithium salt as an electrolyte or a solid membrane system represented by a high molecular weight solid electrolyte system containing a lithium salt.

When the electrolyte layer 14 is the solution system, a nonaqueous electrolyte liquid prepared by dissolving a lithium salt in a nonaqueous solvent may be used as the electrolyte layer 14.

As the lithium slat contained as an electrolyte in the nonaqueous electrolyte liquid, for example, although lithium perchlorate (LiClO$_4$), lithium hexafluorophosphate (LiPF$_6$), lithium tetrafluoroborate (LiBF$_4$), lithium trifluoromethanesulfonate (LiCF$_3$SO$_3$), or lithium bistrifluoromethanesulfonylamide (LiN(CF$_3$SO$_2$)$_2$) may be mentioned, the lithium salt is not limited thereto. As the electrolyte of the nonaqueous electrolyte liquid of the lithium air battery 1, a known lithium salt may be used.

The concentration of the electrolyte in the nonaqueous electrolyte liquid is, for example, 0.5 to 2.5 mol/L. When a solution system electrolyte layer 14 (such as a nonaqueous electrolyte liquid) is used, this nonaqueous electrolyte liquid is held by immersion thereof in the separator as described above, so that the electrolyte layer 14 can be formed.

As the nonaqueous solvent, nonaqueous solvents known as the nonaqueous solvents of the nonaqueous electrolyte liquid of the lithium air battery 1 may be used. Among the above nonaqueous solvents, in particular, a chain ether, such as tetraethylene glycol dimethyl ether or tetraethylene glycol diethyl ether, may be used as the solvent. Compared to a carbonate-based solvent, the chain ether is not likely to cause a side reaction other than the oxidation-reduction reaction of oxygen in the positive electrode 13. Since being unlikely to evaporate and being stable against oxygen radicals, the chain ether is preferable as an air-battery electrolyte liquid. As other nonaqueous solvents, for example, dimethylsulfoxide may also be mentioned. In addition, any one of the compounds of the present disclosure mentioned above may be contained in any one of the positive electrodes of the present disclosure described above.

5. Battery Case

As long as capable of receiving the positive electrode 13, the negative electrode 12, and the electrolyte layer 14 as described above, the battery case 11 of the lithium air battery 1 of this embodiment may have any shape. The shape of the battery case 11 of the lithium air battery 1 of this embodiment is not limited to the shape shown in FIG. 1, and various battery cases, such as a coin type, a flat plate type, a cylindrical type, and a laminate type may be used. The battery case 11 may be either an air-open type battery case or an airtight type battery case. The air-open type battery case has an airflow hole through which the air is charged and discharged and is a case in which the air is contactable with the positive electrode. When the airtight type battery case is used, a supply pipe and an exhaust pipe of a gas (such as air) may be provided for the airtight type battery case. In this case, the gas to be supplied and exhausted may be dry air. In addition, the gas to be supplied and exhausted may have a high oxygen concentration or may be pure oxygen (e.g., oxygen concentration: 99.99%). The oxygen concentration may be high during discharge and may be low during charge.

EXAMPLES

Hereinafter, the present disclosure will be described in more detail with reference to examples. However, the following examples will be described by way of example, and the present disclosure is not limited thereto.

Example 1

Figure 2:
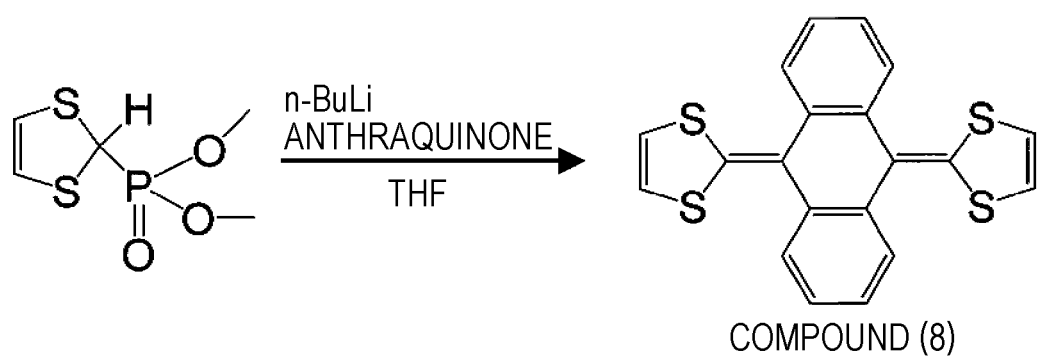
FIG. 2 is a view showing a procedure for synthesis of a compound (8)

First, the compound (8) was synthesized in accordance with the following procedure. The procedure for synthesis of the compound (8) is shown in FIG. 2. By the use of a yellow lamp, every operation was performed in a light shielding environment.

Dimethyl 2-(1,3-dithiole)phosphonate (25g, 118 mmol, 2.2 eq.) and anhydrous THF (2 L) were charged in a 3-L reaction container, so that a solution was prepared. The solution was cooled to −60° C. Next, n-BuLi (75.1 mL, 123 mmol, 2.3 eq.) at 1.64 mol/L was dripped to the solution over 5 minutes. Accordingly, the solution was suspended. The content in the reaction container was stirred at −60° C. for 30 minuets, so that a beige suspension liquid was obtained. Subsequently, anthraquinone (11.1 g, 53.5 mmol, 1.0 eq.) dispersed in THF (500 mL) was added to the suspension liquid. While the inside temperature of the reaction container was slowly increased from −60° C. to −45° C., stirring was performed for 36 hours. Next, the suspension liquid was condensed. To a residue obtained thereby, 500 mL of a mixed solvent of ethanol and city water was added, and the mixture thus obtained was vigorously stirred. In the mixed solvent, the volume ratio of ethanol to city water was 2/1. The suspension liquid thus obtained was filtrated, so that the liquid was removed. A deposit obtained thereby was washed with running city water (300 mL) and ethanol (30 mL), so that a powdered orange crude product (19.6 g) was obtained. The crude product was purified by a column chromatography, so that an orange powder (16.5 g) was obtained. In the column chromatography, 500 g of $SiO_2$ was used. As an eluent of the column chromatography, a hot mixed solvent of $CHCl_3$ and heptane was used. In the mixed solvent, the volume ratio of $CHCl_3$ to heptane was 1/1 at the initial stage of a purification process. As the purification process proceeded, the above volume ratio was gradually increased. At the last stage, the above volume ratio was 2/1. A powder obtained thereby was dispersed in ethanol, and the dispersion liquid was heated for 30 minuets, so that the powder was washed. The dispersion liquid was filtrated, so that the liquid was removed. A deposit obtained thereby was dried at 50° C., so that a powdered orange compound (8) (14.5 g, 38.1 mmol, yield: 71%) was obtained.

The compound (8) was identified by $^1$H-NMR measurement. From the measurement result, it was confirmed that a targeted product (compound (8)) was obtained at a high purity.

Next, a positive electrode was formed. First, as a carbon material, a powder of Ketjen black (manufactured by Lion Corporation) was prepared. As a binder, a powder of a PTFE (manufactured by Daikin Industries, Ltd.) was prepared. The carbon material and the binder were mixed to have a mass ratio of 90:10. After an ethanol solvent was further added, kneading was performed, so that a mixture was obtained. The mixture was rolled by a roll press method, so that an electrode sheet was formed. The electrode sheet thus obtained was cut, so that the positive electrode (positive electrode layer) was obtained.

Next, a nonaqueous electrolyte liquid was prepared. First, lithium bistrifluoromethanesulfonylamide (LiTFSA, manufactured by Kishida Chemical Co., Ltd.) was mixed with and dissolved in tetraethylene glycol dimethyl ether (TEGDME, manufactured by Kishida Chemical Co., Ltd.). The concentration of LITFSA in the mixed solution thus obtained was 1 mol/L. The mixed solution was stirred for 24 hours in a dry air atmosphere having a dew point of −50° C. or less. The compound (8) was dissolved in the mixed solution, so that the nonaqueous electrolyte liquid was obtained. The concentration of the compound (8) in the nonaqueous electrolyte liquid was 10 mmol/L.

Next, as the separator, a glass fiber separator was prepared. A SUS304 mesh was adhered to metal lithium foil, so that a negative electrode was obtained. By the use of the positive electrode, the separator, the nonaqueous electrolyte liquid, and the negative electrode, a lithium air battery having the structure shown in FIG. 1 was formed. Accordingly, a lithium air battery of Example 1 was obtained.

Example 2

Figure 3:
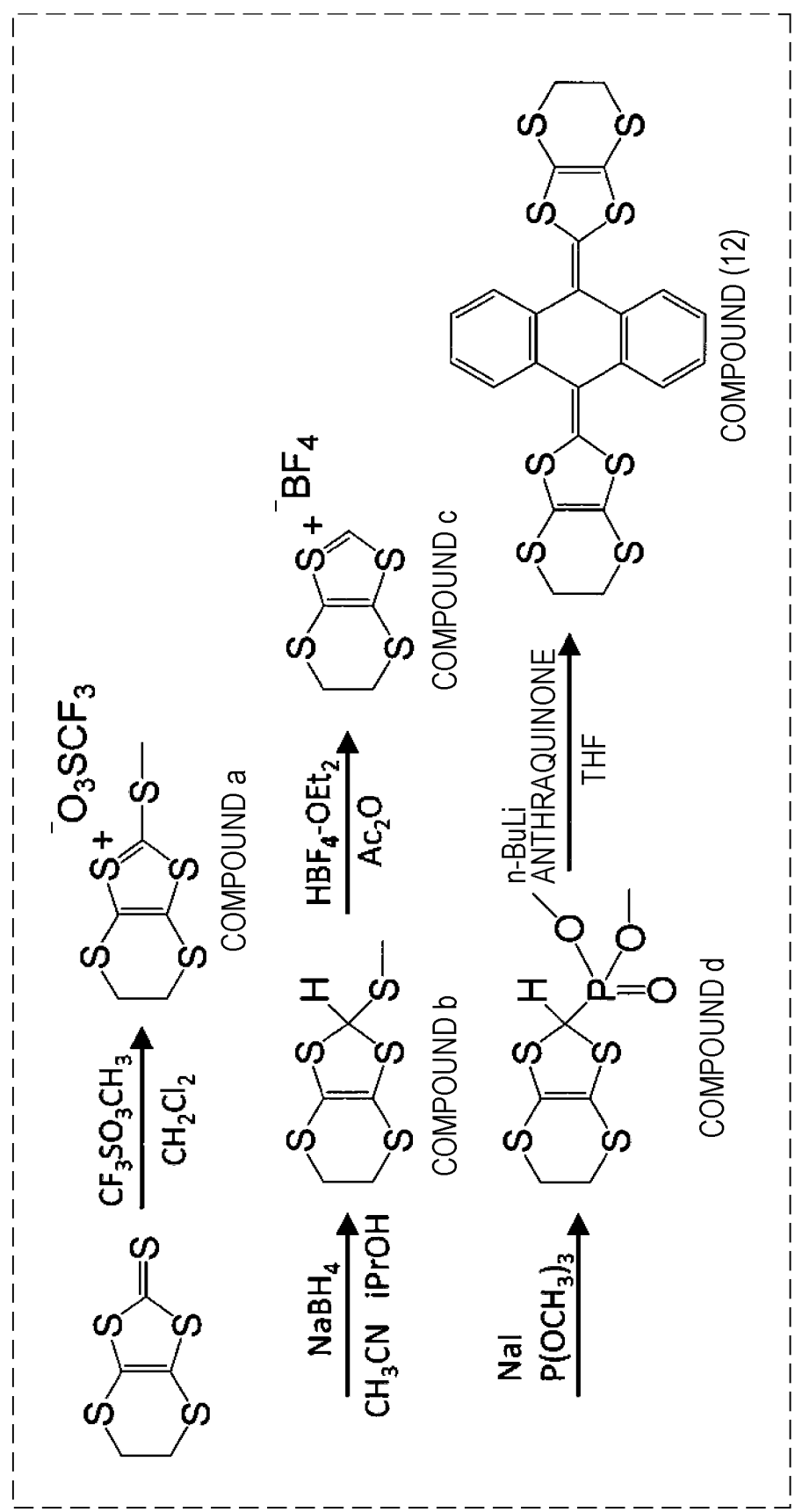
FIG. 3 is a view showing a procedure for synthesis of a compound (12)

First, the compound (12) was synthesized by the following procedure. The procedure for synthesis of the compound (12) is shown in FIG. 3. By the use of a yellow lamp, every operation was performed in a light shielding environment.

In an Ar gas flow environment, 4,5-ethylenedithio-1,3-dithiole-2-thione (45.0 g, 0.201 mol, 1.0 eq.) and dehydrated dichloromethane (315 mL) were charged in a 2-L reaction container. Methyl trifluoromethanesulfonate (24.2 mL, 0.22 mol, 1.1 eq.) was dripped in the reaction container. A solution obtained thereby was stirred at room temperature for one hour and 30 minutes. After dehydrated ether (1 L) was added to the solution, stirring was performed over one night. A precipitated crystal was recovered by filtration. The crystal was dispersed in diethyl ether for washing. Subsequently, the crystal was dried in a high vacuum environment, so that a red-orange crystalline compound a (77.0 g, 0.198 mol, yield: 98%) was obtained.

In an Ar gas flow environment, the compound a (77.0 g, 0.198 mol, 1.0 eq.) and anhydrous acetonitrile (150 mL) were charged in a 1-L reaction container, so that a suspension liquid was obtained. Next, $NaBH_4$ (8.36 g, 0.221 mol, 1.1 eq.) was suspended in anhydrous isopropyl alcohol (30 mL), so that a suspension liquid of isopropyl alcohol was prepared. Next, the reaction container was placed in a water bath. After approximately one third of the suspension liquid of isopropyl alcohol was slowly added to the suspension liquid of the compound a, vigorous stirring was performed. Next, the remaining suspension liquid of isopropyl alcohol was slowly added to the suspension liquid of the compound a so as to maintain the inside temperature of the reaction container at 40° C. or more, and as a result, a pale red solution was obtained. Subsequently, the red solution was stirred at room temperature for three hours. The red solution was added to ice water (1 L) and vigorously stirred for one hour, so that a suspension liquid was obtained. By the use of a mixed solution (150 mL) of ethyl acetate and diethyl ether, an extraction operation was performed on the suspension liquid three times. In the mixed solution, the volume ratio of ethyl acetate to diethyl ether was 1/1. The extracted organic solutions were mixed together. The organic solution was sequentially washed with city water and saturated salt water. The organic solution was dried by anhydrous sodium sulfate. The organic solution was condensed, so that a compound b (44.6 g, 0.185 mol, yield: 93%) in the form of a red-orange liquid was obtained.

In an Ar gas flow environment, the compound b (44.6 g, 0.185 mol, 1.0 eq.) and acetic acid anhydride (270 mL) were charged in a 1-L reaction container, so that a mixed solution was obtained. The mixed solution was cooled to 0° C. or less. An ether complex of $HBF_4$ (26.4 g, 0.203 mol, 1.1 eq.) was dripped to the mixed solution, and stirring was performed for 15 minutes, so that a red suspension liquid was obtained. Next, isopropyl ether (IPE) (2.7 L) was added to the suspension liquid. A crystal precipitated in the suspension liquid was recovered by filtration. The crystal was dried, so that a red-brown crystalline compound c (44.3 g, 0.158 mol, yield: 85%) was obtained.

In an Ar gas flow environment, the compound c (44.3 g, 0.158 mol, 1.0 eq.) and dehydrated THF (800 mL) was charged in a 2-L reaction container. The reaction container was cooled with water, and trimethyl phosphite (37.3 g, 0.316 mol, 2.0 eq.) was charged in the reaction container. Next, sodium iodide (24.8 g, 0.166 mol, 1.05 eq.) was charged in the reaction container. The mixed liquid in the reaction container was stirred for 2 hours. Subsequently, after the solvent was removed from the mixed liquid, and city water (1 L) was added, an extraction operation using dichloromethane (500 mL) was performed four times. The organic solution thus extracted was dehydrated by anhydrous sodium sulfate. The organic solution was condensed, so that a residue was obtained. The residue was suspended in a mixed solvent of ethanol and n-heptane, so that a suspension liquid was obtained. In the mixed solvent, the volume ratio of ethanol to n-heptane was 1/1. Next, the suspension liquid was stirred. A crystal precipitated in the suspension liquid was recovered by filtration. The crystal was dispersed in a mixed solvent of ethanol and n-heptane for washing. In the mixed solvent, the volume ratio of ethanol to n-heptane was 1/1. The crystal was dried in a high vacuum atmosphere, so that a beige crystalline compound d (30.5 g, 0.100 mol, yield: 63%) was obtained.

In an Ar gas flow environment, the compound d (22.5 g, 74.4 mmol, 1.0 eq.) and dehydrated THF (2 L) was charged in a 3-L reaction container, so that a solution was prepared. The solution was cooled to -70° C. The cooling was performed by a cooling bath. Next, a n-butyllithium hexane solution (50 mL, 81.8 mmol, 1.1 eq.) at 1.64 mol/L was dripped to the solution of the compound d. After the solution was stirred for 30 minutes, anthraquinone (6.98 g, 33.5 mmol, 0.45 eq.) dissolved in dehydrated THF (300 mL) was charged in the reaction container. The content in the reaction container was stirred for one hour. The reaction container was recovered from the cooling bath, and the inside temperature of the reaction container was increased to room temperature. Next, the content in the reaction container was stirred over one night, so that a suspension liquid was obtained. After city water (50 mL) was added to the suspension liquid, the suspension liquid was condensed, so that a dried residue was obtained. A suspension washing operation with water (500 mL) was performed four times on the residue. Next, a crystal obtained by filtration of water was dried. A suspension washing operation with ethanol (500 mL) was performed three times on the crystal thus obtained. By drying of the crystal, a red crystal (19.7 g) was obtained. The crystal was purified by a column chromatography, so that a yellow powder (9.92 g) was obtained. In the column chromatography, 450 g of $SiO_2$ and 30 g of $NH-SiO_2$ were used. In the column chromatography, the $SiO_2$ layer was an upper layer. As an eluent of the column chromatography, a hot mixed solvent of $CHCl_3$ and heptane was used. In the mixed solvent, the volume ratio of $CHCl_3$ to heptane was 2/1 at the initial stage of a purification process. As the purification process proceeded, the above volume ratio was increased in a stepwise manner. At the last stage, the above volume ratio was 2/0. A powder obtained thereby was suspended in ethyl acetate (200 mL), and the suspension liquid was heated for washing. The suspension liquid was filtrated, so that a solid was obtained. The solid was washed with running ethanol. The solid was dried in a high vacuum atmosphere, so that a yellow powder (8.74 g) was obtained. Since containing ethyl acetate, the powder was suspended in chloroform (250 mL), and the suspension liquid was heated for washing. After being spontaneously cooled, the suspension liquid was cooled to -30° C. A solid precipitated by this operation was recovered by filtration. The solid was washed with running ethanol. In a high vacuum atmosphere, the solid was dried at 100° C., so that a powdered yellow compound (12) (8.49 g, 15.1 mmol, yield: 45%) was obtained.

The compound (12) was identified by $^1$H-NMR measurement. From the measurement result, it was confirmed that a targeted compound (compound (12)) was obtained at a high purity.

Next, except for that the compound (12) was used instead of using the compound (8), by the same method as that of Example 1, a lithium air battery of Example 2 was formed.

Comparative Example 1

Except for that the compound (8) was not used, by the same method as that of Example 1, a lithium air battery of Comparative Example 1 was formed.

Comparative Example 2

Except for that TTF was used instead of using the compound (8), and the concentration of TTF in the non-aqueous electrolyte liquid was set to 20 mmol/L, by the same method as that of Example 1, a lithium air battery of Comparative Example 2 was formed.

(Charge/Discharge Test)

After the lithium air battery of each of Examples 1 and 2 and Comparative Examples 1 and 2 was held in an oxygen atmosphere for 20 minutes or more, a charge/discharge test was performed. The current density during discharge was 0.4 mA/cm², and the cutoff voltage was 2.0 V. The current density during charge was 0.1 mA/cm², and the cutoff voltage was 4.5 V. After the discharge was performed, the charge was performed.

Figure 4:
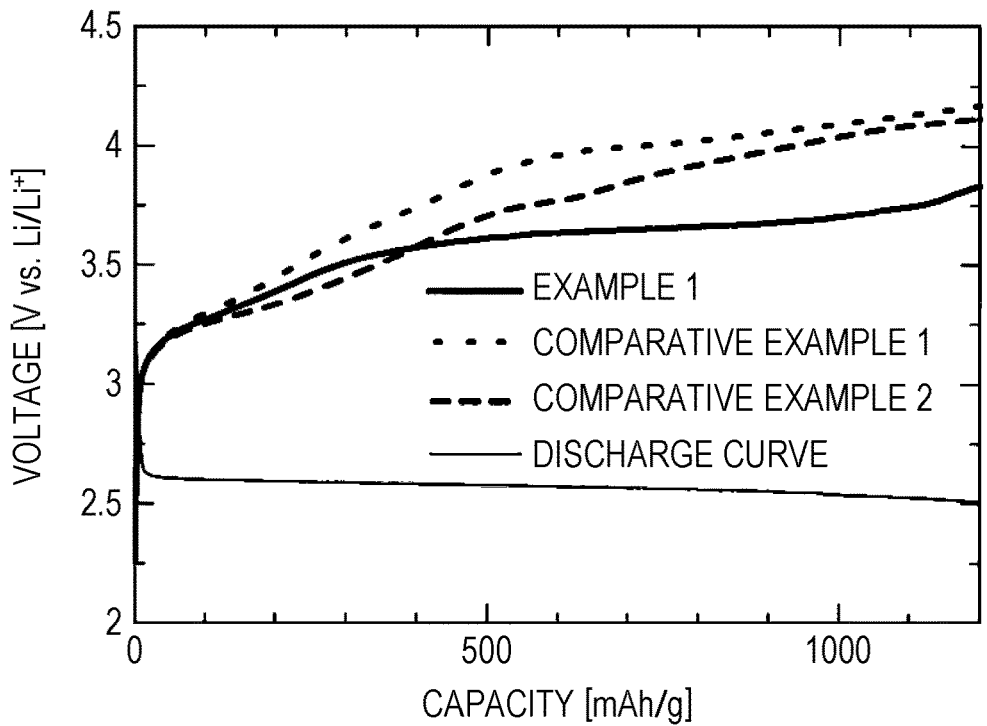
FIG. 4 is a graph showing a charge/discharge curve of a lithium air battery of each of Example 1, Comparative Example 1, and Comparative Example 2.
Figure 5:
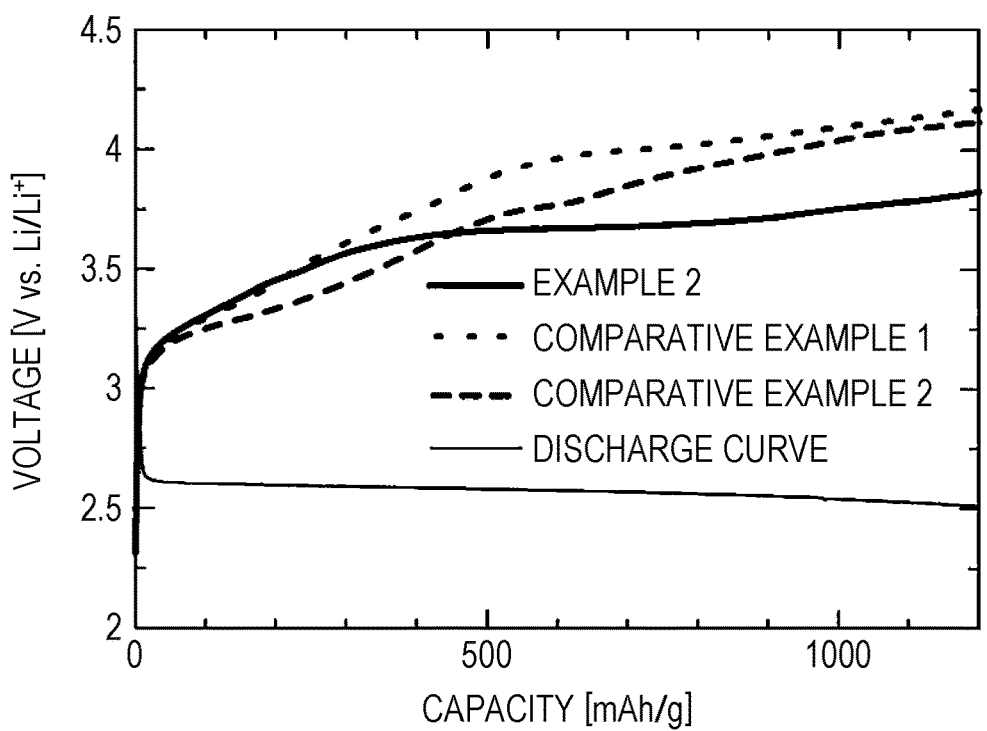
FIG. 5 is a graph showing a charge/discharge curve of a lithium air battery of each of Example 2, Comparative Example 1, and Comparative Example 2.

FIG. 4 is a graph showing a charge/discharge curve of the lithium air battery of each of Example 1 and Comparative Examples 1 and 2. FIG. 5 is a graph showing a charge/discharge curve of the lithium air battery of each of Example 2 and Comparative Examples 1 and 2. As shown in FIGS. 4 and 5, the charge potential of the lithium air battery of each of Examples 1 and 2 was lower than the charge potential of the lithium air battery of Comparative Example 1. From the results thus obtained, it is estimated that since being changed into a dicationic compound by oxidation on the surface of the positive electrode, the compound (8) or the compound (12) functions as the charging catalyst which efficiently decomposes lithium peroxide.

Figure 6A:
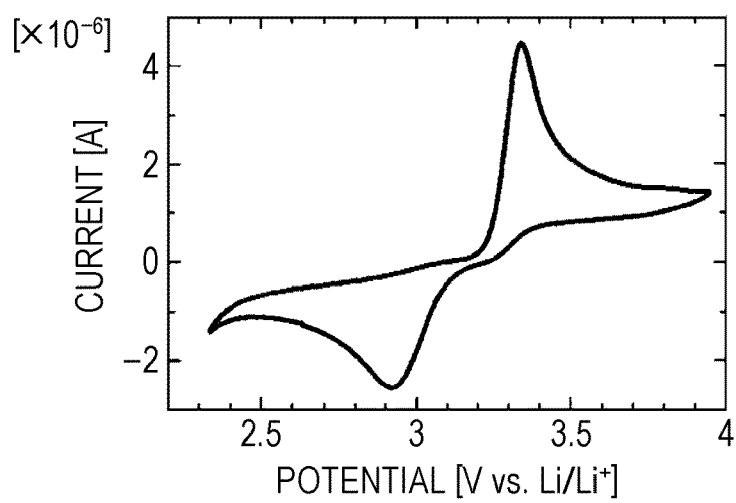
FIG. 6A is a graph showing a cyclic voltammogram of the compound (8)
Figure 6B:
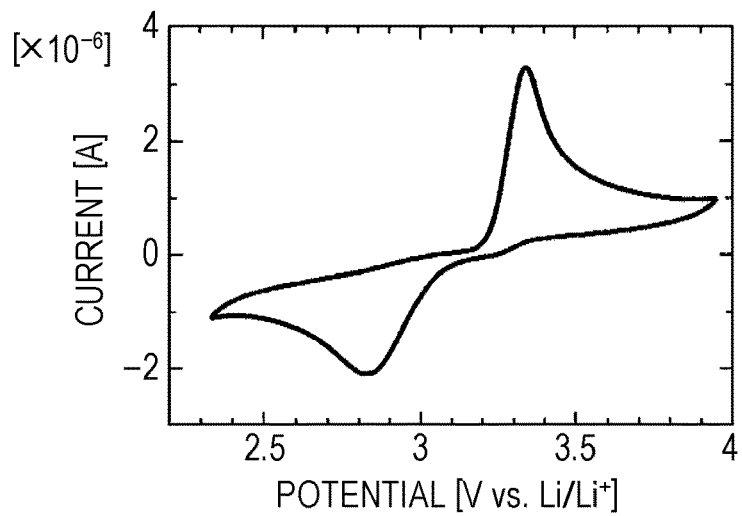
FIG. 6B is a graph showing a cyclic voltammogram of the compound (12)
Figure 6C:
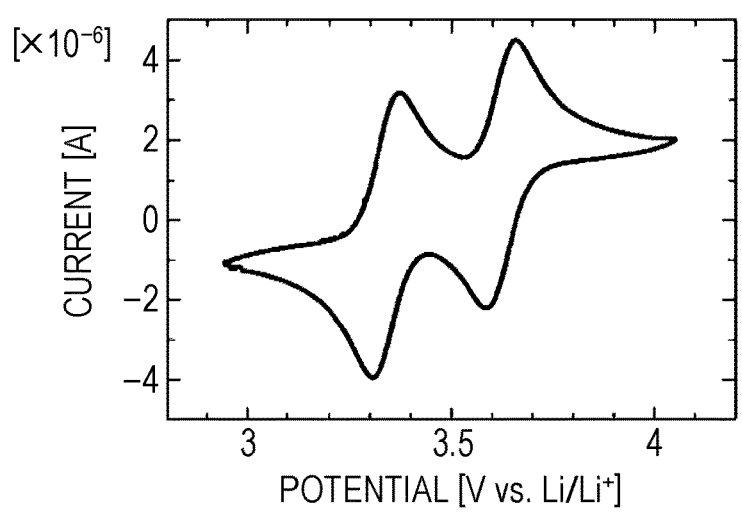
FIG. 6C is a graph showing a cyclic voltammogram of TTF.

The charge potential of the lithium air battery of each of Examples 1 and 2 was lower than the charge potential of the lithium air battery of Comparative Example 2 at a late charge stage. FIG. 6A is a graph showing a cyclic voltammogram of the compound (8). FIG. 6B is a graph showing a cyclic voltammogram of the compound (12). FIG. 6C is a graph showing a cyclic voltammogram of TTF. As shown in FIGS. 6A to 6C, the oxidation potential of each of the compound (8) and the compound (12) was approximately 3.4 V and was approximately equivalent to a first-step oxidation potential of TTF. Furthermore, in Examples 1 and 2, the concentration of each of the compound (8) and the compound (12) in the nonaqueous electrolyte liquid was one half of the concentration of TTF in the nonaqueous electrolyte liquid of Comparative Example 2. That is, compared to TTF, the compound (8) and the compound (12) each had an effect of significantly decreasing the charge potential although the concentration thereof was small. Although TTF is one-electron oxidized by one step, the compound (8) and the compound (12) are each two-electron oxidized by one step, and hence, the effect described above can be obtained. That is, one molecule of each of the compound (8) and the compound (12) has substantially the same effect as that of two TTF molecules. The compound (8) and the compound (12) each have an extended π electron conjugated structure. Hence, according to the molecular structure of each of the compound (8) and the compound (12), the area of a portion at which electron transfer can be performed is wide. Accordingly, a reaction effective area between lithium peroxide and any one of the compound (8) and the compound (12) is large.

At an initial charge stage, the charge potential of the lithium air battery of each of Examples 1 and 2 was higher the charge potential of the lithium air battery of Comparative Example 2. The reason for this is as follows. The compound (8) and the compound (12) are each oxidized to a dicationic state but not to a monocationic state. That is, when being oxidized to a dicationic state, the compound (8) and the compound (12) each start to function as a catalyst. At the initial charge stage, the production amount of the dicationic compound of each of the compound (8) and the compound (12) functioning as a catalyst is not sufficient. Hence, at the initial charge stage, the compound (8) and the compound (12) each have not an effect of decreasing the charge potential as compared to that of TTF. However, in order to prevent a high-voltage application to each member of the lithium air battery, at the late charge stage, the charge potential of the lithium air battery is required to be decreased. As described above, the compound (8) and the compound (12) each can significantly decrease the charge potential at the late charge stage.

The lithium air battery of each of Examples 1 and 2 has a low charge potential. As described above, in the lithium air battery of the present disclosure can avoid the case in which a high voltage is applied to each member. Hence, in the lithium air battery of the present disclosure, the member thereof can be suppressed from being degraded by oxidation. According to the π electron conjugated compound, although the content thereof is small, while a large capacity of the lithium air battery is secured, the charge potential of the lithium air battery can be decreased.

The lithium air battery of the present disclosure is useful, for example, as a secondary battery.

What is claimed is:

1. A lithium air battery comprising:
a negative electrode configured to occlude and release lithium ions;
a positive electrode configured to use oxygen in air as a positive electrode active material; and
an electrolyte liquid that is configured to function as a nonaqueous lithium ion conductor, and that is disposed between the negative electrode and the positive electrode, wherein
the electrolyte liquid contains a compound represented by the following formula (1):

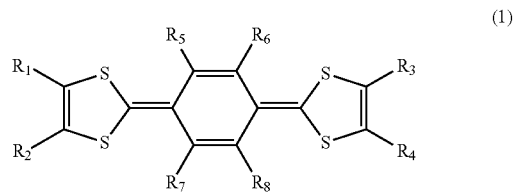

where $R_1$ to $R_4$ each independently represent a hydrogen atom, a halogen atom, a nitro group, a sulfate group, an alkoxycarbonyl group, or a hydrocarbon group having 1 to 12 carbon atoms, $R_5$ to $R_8$ each independently represent a hydrogen atom, a nitro group, a sulfate group, an alkoxycarbonyl group, or a hydrocarbon group having 1 to 22 carbon atoms, at least one selected from the group consisting of $R_5$ to $R_8$ is not a hydrogen atom, the hydrocarbon groups of $R_1$ to $R_8$ each may independently contain at least one selected from the group consisting of a halogen atom, a nitrogen atom, an oxygen atom, a sulfur atom, a silicon atom, and a phosphorus atom, $R_1$ and $R_2$ may be connected to each other to constitute a ring structure, $R_3$ and $R_4$ may be connected to each other to constitute a ring structure, $R_5$ and $R_6$ may be connected to each other to constitute a ring structure, and $R_7$ and $R_8$ may be connected to each other to constitute a ring structure.

2. The lithium air battery according to claim 1,
wherein the compound is represented by the following formula (2):

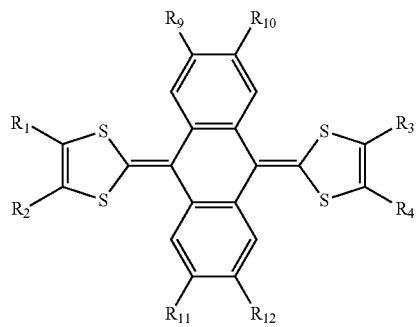

(2)

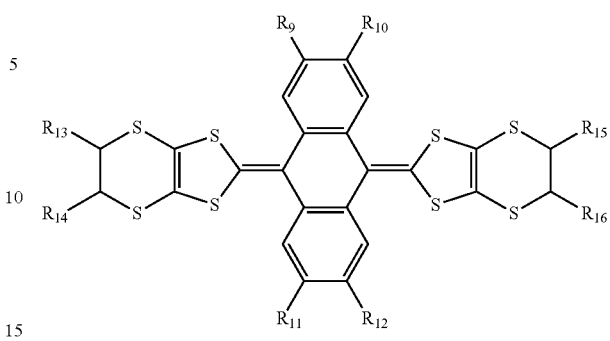

(3)

where $R_1$ to $R_4$ each independently represent a hydrogen atom, a halogen atom, a nitro group, a sulfate group, an alkoxycarbonyl group, or a hydrocarbon group having 1 to 12 carbon atoms, $R_9$ to $R_{12}$ each independently represent a hydrogen atom, a halogen atom, a nitro group, a sulfate group, an alkoxycarbonyl group, or a hydrocarbon group having 1 to 14 carbon atoms, the hydrocarbon groups of $R_1$ to $R_4$ and $R_9$ to $R_{12}$ each may independently contain at least one selected from the group consisting of a halogen atom, a nitrogen atom, an oxygen atom, a sulfur atom, a silicon atom, and a phosphorus atom, $R_1$ and $R_2$ may be connected to each other to constitute a ring structure, $R_3$ and $R_4$ may be connected to each other to constitute a ring structure, $R_9$ and $R_{10}$ may be connected to each other to constitute a ring structure, and $R_{11}$ and $R_{12}$ may be connected to each other to constitute a ring structure.

3. The lithium air battery according to claim 2,
wherein in the formula (2), $R_1$ to $R_4$ and $R_9$ to $R_{12}$ each represent a hydrogen atom.

4. The lithium air battery according to claim 1,
wherein the compound is represented by the following formula (3):

where $R_9$ to $R_{12}$ each independently represent a hydrogen atom, a halogen atom, a nitro group, a sulfate group, an alkoxycarbonyl group, or a hydrocarbon group having 1 to 14 carbon atoms, $R_{13}$ to $R_{16}$ each independently represent a hydrogen atom, a halogen atom, a nitro group, a sulfate group, an alkoxycarbonyl group, or a hydrocarbon group having 1 to 5 carbon atoms, the hydrocarbon groups of $R_9$ to $R_{16}$ each may independently contain at least one selected from the group consisting of a halogen atom, a nitrogen atom, an oxygen atom, a sulfur atom, a silicon atom, and a phosphorus atom, $R_9$ and $R_{10}$ may be connected to each other to constitute a ring structure, $R_{11}$ and $R_{12}$ may be connected to each other to constitute a ring structure, $R_{13}$ and $R_{14}$ may be connected to each other to constitute a ring structure, and $R_{15}$ and $R_{16}$ may be connected to each other to constitute a ring structure.

5. The lithium air battery according to claim 4,
wherein in the formula (3), $R_9$ to $R_{16}$ each represent a hydrogen atom.

6. The lithium air battery according to claim 1,
wherein the concentration of the compound in the electrolyte liquid is 0.01 mmol/L or more.

7. The lithium air battery according to claim 1,
wherein the electrolyte liquid further contains tetraethylene glycol dimethyl ether.

8. The lithium air battery according to claim 1,
wherein the compound is further contained in the positive electrode.

\* \* \* \* \*